(12) United States Patent
Mizusaki et al.

(10) Patent No.: US 9,151,987 B2
(45) Date of Patent: Oct. 6, 2015

(54) LIQUID CRYSTAL DISPLAY DEVICE AND PRODUCTION METHOD FOR LIQUID CRYSTAL DISPLAY DEVICE

(75) Inventors: Masanobu Mizusaki, Osaka (JP); Youhei Nakanishi, Osaka (JP); Takeshi Noma, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/003,976

(22) PCT Filed: Mar. 8, 2012

(86) PCT No.: PCT/JP2012/055942
§ 371 (c)(1),
(2), (4) Date: Sep. 9, 2013

(87) PCT Pub. No.: WO2012/121321
PCT Pub. Date: Sep. 13, 2012

(65) Prior Publication Data
US 2013/0342791 A1    Dec. 26, 2013

(30) Foreign Application Priority Data
Mar. 9, 2011    (JP) ................................ 2011-051533

(51) Int. Cl.
| | | |
|---|---|---|
| C09K 19/52 | (2006.01) | |
| C09K 19/38 | (2006.01) | |
| C09K 19/54 | (2006.01) | |
| G02F 1/1337 | (2006.01) | |
| C09K 19/14 | (2006.01) | |
| C09K 19/04 | (2006.01) | |

(52) U.S. Cl.
CPC .......... *G02F 1/133711* (2013.01); *C09K 19/14* (2013.01); *G02F 1/133703* (2013.01); *C09K 2019/0444* (2013.01); *C09K 2019/0448* (2013.01); *C09K 2019/548* (2013.01); *C09K 2219/03* (2013.01); *G02F 1/133788* (2013.01); *G02F 2001/133765* (2013.01)

(58) Field of Classification Search
CPC ..................... C09K 19/548; C09K 2019/0448; C09K 2219/03; G02F 1/133703; G02F 1/133711; G02F 1/133788; G02F 2001/137653
USPC ............................. 252/299.01, 299.5; 349/86
See application file for complete search history.

(56) References Cited

U.S. PATENT DOCUMENTS

| | | | |
|---|---|---|---|
| 6,093,344 A | 7/2000 | Park et al. | |
| 8,999,465 B2 | 4/2015 | Nakanishi et al. | |
| 9,036,119 B2* | 5/2015 | Mizusaki et al. | 349/123 |
| 9,068,024 B2* | 6/2015 | Enomoto et al. | 1/1 |
| 2003/0231272 A1 | 12/2003 | Nakamura et al. | |
| 2004/0188653 A1 | 9/2004 | Kataoka et al. | |
| 2005/0109985 A1 | 5/2005 | Kataoka et al. | |
| 2005/0136196 A1 | 6/2005 | Kataoka et al. | |
| 2005/0264737 A1 | 12/2005 | Kataoka et al. | |
| 2006/0054859 A1 | 3/2006 | Shundo et al. | |
| 2006/0066793 A1 | 3/2006 | Ohmuro et al. | |
| 2006/0103804 A1 | 5/2006 | Hirosawa | |
| 2006/0204680 A1 | 9/2006 | Hattori et al. | |
| 2006/0209240 A1 | 9/2006 | Kataoka | |
| 2007/0206129 A1 | 9/2007 | Nakamura et al. | |
| 2009/0056853 A1 | 3/2009 | Pai et al. | |
| 2009/0147200 A1 | 6/2009 | Okuyama et al. | |
| 2010/0045906 A1 | 2/2010 | Tokuda et al. | |
| 2010/0053527 A1 | 3/2010 | Hsieh et al. | |
| 2010/0221456 A1 | 9/2010 | Kataoka et al. | |
| 2012/0050631 A1 | 3/2012 | Ohmuro et al. | |
| 2012/0177847 A1 | 7/2012 | Nakamura et al. | |
| 2012/0219729 A1 | 8/2012 | Kataoka et al. | |
| 2013/0324633 A1* | 12/2013 | Enomoto et al. | 522/34 |
| 2014/0002782 A1 | 1/2014 | Nakanishi et al. | |
| 2014/0139794 A1* | 5/2014 | Ohnishi et al. | 349/123 |
| 2014/0168586 A1* | 6/2014 | Mizusaki et al. | 349/123 |

(Continued)

FOREIGN PATENT DOCUMENTS

| | | |
|---|---|---|
| JP | H06-230394 | 8/1994 |
| JP | 2000-314887 | 11/2000 |

(Continued)

OTHER PUBLICATIONS

International Search Report for corresponding PCT Application No. PCT/JP2012/055942, mailed Jun. 12, 2012 (with English language translation).

International Search Report for corresponding PCT Application No. PCT/JP2012/055960, mailed Apr. 3, 212 (with English language translation).

International Search Report for corresponding PCT Application No. PCT/JP2012/052261, mailed Feb. 12, 2012 (with English language translation).

(Continued)

*Primary Examiner* — Shean C Wu
(74) *Attorney, Agent, or Firm* — Greer Burns & Crain, Ltd.

(57) ABSTRACT

The present invention provides a liquid crystal display device in which display defects and reduction in the voltage holding ratio are not likely to occur even without alignment films. That is, the liquid crystal display device of the present invention includes: a pair of substrates each substantially having no alignment film; a liquid crystal layer which is disposed between the pair of substrates and contains a liquid crystal material; and a polymer layer which is formed on a surface of at least one of the substrates and controls alignment of liquid crystal molecules, the polymer layer being formed by polymerization of one or more kinds of radical polymerizable monomers added to the liquid crystal layer, at least one kind of the radical polymerizable monomers being a compound generating radicals through a self-cleavage reaction by exposure to light and having at least two radical polymerizable groups.

20 Claims, 2 Drawing Sheets

(56) References Cited

U.S. PATENT DOCUMENTS

| | | | |
|---|---|---|---|
| 2014/0285762 A1 | 9/2014 | Noma et al. | |
| 2014/0333879 A1* | 11/2014 | Noma et al. | 349/124 |
| 2015/0062518 A1* | 3/2015 | Mizusaki et al. | 349/124 |
| 2015/0092145 A1* | 4/2015 | Mizusaki | 349/123 |

FOREIGN PATENT DOCUMENTS

| | | |
|---|---|---|
| JP | 2001-004986 | 1/2001 |
| JP | 2004-004329 | 1/2004 |
| JP | 2004-101782 | 4/2004 |
| JP | 2004-184846 | 7/2004 |
| JP | 2004-294648 | 10/2004 |
| JP | 2004-302061 | 10/2004 |
| JP | 2005-181582 | 7/2005 |
| JP | 2005-206579 | 8/2005 |
| JP | 2005-338613 | 12/2005 |
| JP | 2006-091545 | 4/2006 |
| JP | 2006-139047 | 6/2006 |
| JP | 2006-145992 | 6/2006 |
| JP | 2010-032860 | 2/2010 |
| JP | 2010-191450 | 9/2010 |
| WO | 2008/065818 | 6/2008 |
| WO | 2012/032857 | 3/2012 |
| WO | 2012/050178 | 4/2012 |

OTHER PUBLICATIONS

Office Action issued by the U.S. Patent and Trademark Office for U.S. Appl. No. 13/984,830, mailed Apr. 15, 2015.
Office Action issued by the U.S. Patent and Trademark Office for U.S. Appl. No. 14/003,470, mailed Dec. 4, 2014.
U.S. Appl. No. 14/003,470, filed Sep. 6, 2013.
U.S. Appl. No. 13/984,830, filed Aug. 9, 2013.
Office Action issued by the U.S. Patent and Trademark Office for U.S. Appl. 13/984,830, issued Jun. 18, 2015.
Office Action issued by the U.S. Patent and Trademark Office for U.S. Appl. No. 14/003,470, issued Jun. 15, 2015.

* cited by examiner

LIQUID CRYSTAL DISPLAY DEVICE AND PRODUCTION METHOD FOR LIQUID CRYSTAL DISPLAY DEVICE

This application is the U.S. national phase, filed under 35 U.S.C. §371, of International Application No. PCT/JP2012/055942, filed Mar. 8, 2012, which claims priority to Japanese Patent Application No. 2011-0051533, filed Mar. 9, 2011, the entire contents of both of which are incorporated by reference herein.

TECHNICAL FIELD

The present invention relates to a liquid crystal display device and a method for producing a liquid crystal display device. More specifically, the present invention relates to a liquid crystal display device controlling the alignment of liquid crystal molecules using a polymer layer obtained by polymerizing monomers in a liquid crystal composition without existing alignment films, and a method for producing a liquid crystal display device which is suitable for formation of the polymer layer.

BACKGROUND ART

Since liquid crystal displays are thin, light, and consume little power, they are widely used as a display for televisions, personal computers, and PDAs, for example. Particularly in recent years, upsizing of liquid crystal display devices has been rapidly progressing, as represented by liquid crystal display devices for televisions, for example. A suitable mode for an upsized liquid crystal display device is a multi-domain vertical alignment (MVA) mode which provides a wide viewing angle and allows production of a display device in high yield even if the device has a large area. Since liquid crystal molecules are aligned vertically to the substrate surfaces when a voltage is not applied to the liquid crystal layer in the multi-domain vertical alignment mode, a high contrast ratio can be achieved compared to the conventional twisted nematic (TN) mode.

In the MVA mode, the tilt direction of liquid crystal molecules is not controlled by alignment films, but is influenced by protrusions (ribs) formed from an insulating material. Therefore, an alignment treatment step for the alignment films is unnecessary, and static electricity and shavings due to factors such as rubbing are not generated, which eliminate the need for steps such as a washing step after the alignment treatment. The MVA mode leads to low diversity in initial tilts of liquid crystal molecules, and is effective in simplifying the process, improving the yield, and reducing the cost.

Still, the MVA mode requires formation of a base film corresponding to an alignment film even though it eliminates the need for an alignment treatment. Actually, the base film is also preferably eliminated in consideration of the influence of the film thickness unevenness or foreign matter contamination of the base film on the alignment of the liquid crystal molecules, and the capital investment and an increase in the number of production steps for formation of the base film.

To solve this problem, a technology for providing pretilt angles has been drawing attention which includes injecting between substrates a liquid crystal composition obtained by mixing liquid crystals with polymerizable components such as monomers or oligomers (hereinafter, also referred to as "components such as monomers"), and forming a polymer layer by polymerizing the components such as monomers while a voltage is applied between the substrates to tilt the liquid crystal molecules (for example, Patent Literatures 1 and 2). Such a polymer layer (hereinafter, also referred to as a "polymer sustained alignment (PSA) layer") enables the liquid crystals to have a predetermined pretilt angle even after elimination of the voltage, so that the tilt direction of the liquid crystal molecules can be maintained. Here, the components such as monomers are polymerized by irradiation with heat or light (e.g., ultraviolet light).

CITATION LIST

Patent Literature

Patent Literature 1: JP 2010-191450 A
Patent Literature 2: JP 2006-145992 A

SUMMARY OF INVENTION

Technical Problem

However, the studies made by the present inventors revealed that favorable display may not be achieved depending on the materials used and the production conditions, even when a polymer layer has been produced by injecting between a pair of substrates a liquid crystal composition containing materials such as a liquid crystal material, monomers, and a polymerization initiator, and initiating a polymerization reaction under predetermined conditions. More specifically, in the case of using monomers represented by the following formula (13) shown in Patent Literature 1,

[Chem. 1]

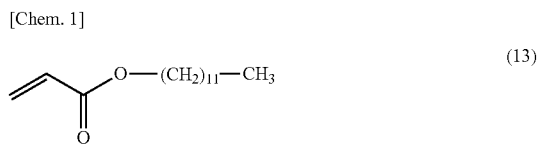
(13)

a hysteresis may be caused in V-T characteristics to cause defects in the alignment, which may result in small bright points or bright lines in black display. Also, in the case of using a polymerization initiator represented by the following formula (11) shown in Patent Literature 2,

[Chem. 2]

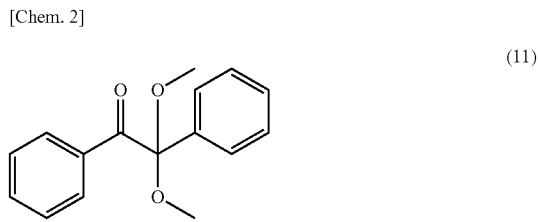
(11)

molecules which have not contributed to the initiation of polymerization may remain in the liquid crystal layer, causing reduction in the voltage holding ratio (VHR).

The present invention has been made in view of the above current state of the art, and aims to provide a liquid crystal display device in which display defects and reduction in the voltage holding ratio are not likely to occur even without alignment films.

Solution to Problem

The present inventors have made various studies on methods of achieving favorable display without alignment films, and have focused on the kinds of monomers to be mixed into the liquid crystal composition. The present inventors have found that a lauryl acrylate represented by the above formula (13) has a weak interaction with liquid crystal molecules to easily cause alignment defects, affecting the display. The inventors have also found that when a compound having a biphenyl structure and having sufficient interaction with liquid crystal molecules, which is represented by the following formula (10):

[Chem. 3]

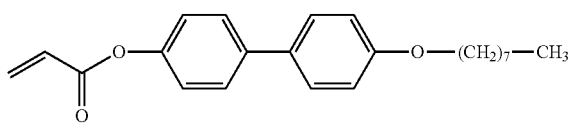

(10)

is used, for example, the resulting PSA layers alone can achieve stable alignment without alignment films. However, further studies have revealed that use of monomers represented by the above formula (10) alone may reduce the voltage holding ratio.

The present inventors have therefore made further intensive studies. As a result, they have found that the alignment can be stabilized and the voltage holding ratio can be maintained when one or more kinds of monomers are mixed into the liquid crystal composition, and at least one kind of the monomers is a monomer generating radicals through a self-cleavage reaction by exposure to light and having at least two radical polymerizable groups.

Here, the present inventors have focused on the problem that, since a conventional polymerization initiator does not have polymerizable groups, the polymerization initiator remains in the liquid crystal layer. As a result, the inventors have found the following. That is, a self-cleaving photopolymerization initiator to which a polymerizable group is bonded is added as a material for forming PSA layers to the liquid crystal material. The initiator undergoes self-cleavage when exposed to light and thus efficiently generates radicals to promote polymerization. Also, components generated by the cleavage during the reaction have a polymerizable group. Here, the initiator itself is polymerized to form a PSA layer. Thereby, the initiator components can be effectively phase-separated from the liquid crystal layer.

Consequently, the present inventors have solved the above problems, completing the present invention.

That is, one aspect of the present invention is a liquid crystal display device including: a pair of substrates each substantially having no alignment film; a liquid crystal layer which is disposed between the pair of substrates and contains a liquid crystal material; and a polymer layer which is formed on a surface of at least one of the substrates and controls alignment of liquid crystal molecules, the polymer layer being formed by polymerization of one or more kinds of radical polymerizable monomers added to the liquid crystal layer, at least one kind of the radical polymerizable monomers being a compound generating radicals through a self-cleavage reaction by exposure to light and having at least two radical polymerizable groups.

The liquid crystal display device of the present invention is not especially limited by other components as long as it essentially includes the above-mentioned components.

The liquid crystal material may have positive dielectric constant anisotropy or negative dielectric constant anisotropy. Still, when a liquid crystal material having negative dielectric constant anisotropy is used to form the polymer layer such that the liquid crystal molecules near the polymer layer are vertically aligned, a vertical alignment (VA) mode liquid crystal display device having a high contrast ratio can be obtained.

In the liquid crystal display device of the present invention, one of the pair of substrates may be an array substrate, and the other substrate may be a color filter substrate, for example. The array substrate is provided with a plurality of pixel electrodes with which the alignment of liquid crystals is controlled in each pixel. The color filter substrate has sets of color filters of a plurality of colors at positions overlapping the respective pixel electrodes in the array substrate, with which colors to be displayed are controlled in each pixel.

Neither of the pair of substrates in the present invention substantially has an alignment film. The alignment film is a monolayer or multilayer film formed from a polyimide, a polyamic acid, a polymaleimide, a polyamide, a polysiloxane, a polyphosphazene, a polysilsesquioxane, or a copolymer thereof, or a film formed by oblique deposition of a silicon oxide. The film is formed on the outermost surface of a substrate, and is capable of controlling alignment of liquid crystals. In a common liquid crystal display device, an alignment film is formed by direct application of an alignment film material (e.g., application of a material containing at least one of a polyimide, a polyamic acid, a polymaleimide, a polyamide, a polysiloxane, a polyphosphazene, a polysilsesquioxane, or a copolymer thereof) or vapor-deposition (e.g., oblique deposition of a silicon oxide (SiO)), at a part constituting the display region. The display region is for displaying an image recognizable by an observer, and does not include, for example, a peripheral region such as terminals. The alignment film is not necessarily subjected to an alignment treatment as long as it has a conventional alignment film material such as a polyimide applied thereto. Examples of the alignment treatment include a rubbing treatment and a photoalignment treatment. Even without such an alignment treatment, a vertical alignment film, for example, enables liquid crystal molecules to be aligned vertically to the film surface, while a horizontal alignment film enables the liquid crystal molecules to be aligned horizontally to the film surface. When an alignment control structure is provided as in the case of the MVA mode or the PVA mode described below, the tilt of liquid crystal molecules can be controlled without such an alignment treatment. The expression "neither of . . . substantially has an alignment film" herein means that such an existing alignment film is not formed.

A polymer layer for controlling the alignment of liquid crystal molecules is formed on a surface of at least one of the pair of substrates. The polymer layer is formed by polymerization of one or more kinds of radical polymerizable monomers added to the liquid crystal layer. Formation of the polymer layer can set the initial tilt of liquid crystal molecules near the polymer layers to a certain direction even without alignment films. For example, when monomers are polymerized to form a polymer layer in a state that the liquid crystal molecules are aligned at a pretilt angle, the resulting polymer layer has a structure that aligns liquid crystal molecules at the pretilt angle.

At least one kind of the radical polymerizable monomers is a compound generating radicals through a self-cleavage reaction by exposure to light, and having at least two radical polymerizable groups. Such a monomer allows the polymerization reaction to proceed in a short time without another polymerization initiator. In addition, impurities from the polymerization initiator are not generated, whereby reduction in the voltage holding ratio (VHR) in the liquid crystal layer is prevented, and deterioration of the display qualities can be reduced. Also, since only a short-time exposure to light is required, deterioration of the constitutional components due to a long-time exposure to light can be prevented, and a liquid crystal display device with high reliability can be produced.

Examples of the radical polymerizable group include a (meth)acryloyloxy group, a (meth)acryloylamino group, a vinyl group, and a vinyloxy group. The (meth)acryloyloxy group herein refers to an acryloyloxy group or a methacryloyloxy group, and the (meth)acryloylamino group refers to an acryloylamino group or a methacryloylamino group.

The compound generating radicals through a self-cleavage reaction by exposure to light preferably generates radicals when exposed to light having a wavelength of 350 nm or more. The compound generating radicals through a self-cleavage reaction by exposure to light preferably generates radicals when exposed to light having a wavelength of less than 400 nm. Since irradiation with light having a wavelength of 350 nm or less can deteriorate the structures in the panel to deteriorate the performance of the display, the self-cleaving photopolymerization initiator having a polymerizable group bonded thereto preferably causes a self-cleavage reaction efficiently when exposed to light having a wavelength of 350 nm or more, thereby generating radicals. Also, in the case that the photopolymerization initiator absorbs light at 400 nm or more from the backlight (cold cathode fluorescence tube or LED) for display in common usage, if the photopolymerization initiator having gone through phase separation due to polymerization without being cleaved is reacted while the display is driven, the long-term reliability is considered to decrease. To produce a liquid crystal display device with high long-term reliability, a polymerizable group is bonded to a photopolymerizable compound having no or sufficiently low absorption at 400 nm or more.

Examples of the radical polymerizable monomer include monomers having a polymerizable group bonded to a self-cleaving photopolymerization initiator generating radicals through a self-cleavage reaction by exposure to light. Specific examples thereof include monomers obtained by directly bonding a polymerizable group to or bonding a functional group having a polymerizable group to the molecular framework of the following self-cleaving photopolymerization initiators: 2,2-dimethoxy-1,2-diphenylethan-1-one (product name: IRGACURE 651, product of BASF, the same applies to the following), 1-hydroxy-cyclohexyl-phenyl-ketone (product name: IRGACURE 184), 2-hydroxy-2-methyl-1-phenyl-propan-1-one (product name: IRGACURE 1173), 1-[4-(2-hydroxyethoxy)-phenyl]-2-hydroxy-2-methyl-1-propan-1-one (product name: IRGACURE 2959), 2-hydroxy-1-{4-[4-(2-hydroxy-2-methyl-propionyl)-benzyl]-phenyl}-2-methyl-propan-1-one (product name: IRGACURE 127), phenylglyoxylic acid methyl ester (product name: DAROCURMBF), 2-methyl-1-[4-(methylthio)phenyl]-2-morpholinopropan-1-one (product name: IRGACURE 907), 2-benzyl-2-dimethylamino-1-(4-morpholinophenyl)-butanone-1 (product name: IRGACURE 369), 2-dimethylamino-2-(4-methyl-benzyl)-1-(4-morpholin-4-yl-phenyl)-butan-1-one (product name: IRGACURE 379), bis(2,4,6-trimethylbenzoyl)-phenylphosphine oxide (product name: ORGACURE 819), 2,4,6-trimethylbenzoyl-diphenyl-phosphine oxide (product name: DAROCURTPO), bis($\eta^5$-2,4-cyclopentadien-1-yl)-bis(2,6-difluoro-3-(1H-pyrrol-1-yl)phenyl)titanium (product name: IRGACURE 784), 1,2-octanedione,1-[4-(phenylthio)-,2-(O-benzoyloxime)] (product name: IRGACUREOXE 01), ethanone,1-[9-ethyl-6-(2-methylbenzoyl)-9H-carbazol-3-yl]-,1-(O-acetyloxime) (product name: IRGACUREOXE 02), and 2-ethylhexyl-4-dimethylaminobenzoate (product name: DAROCUREHA).

The compound generating radicals through a self-cleavage reaction by exposure to light and having at least two radical polymerizable groups is preferably a self-cleaving photopolymerization initiator having an absorption coefficient of 20 ml/g·cm or less for light having a wavelength of 400 nm or more, in view of the driving conditions of the liquid crystal display device. Specific examples thereof include monomers obtained by directly bonding a polymerizable group to or bonding a functional group having a polymerizable group to the molecular framework of the following self-cleaving photopolymerization initiators: 2,2-dimethoxy-1,2-diphenylethan-1-one (product name: IRGACURE 651, product of BASF, the same applies to the following), 1-hydroxy-cyclohexyl-phenyl-ketone (product name: IRGACURE 184), 2-hydroxy-2-methyl-1-phenyl-propan-1-one (product name: IRGACURE 1173), 1-[4-(2-hydroxyethoxy)-phenyl]-2-hydroxy-2-methyl-1-propan-1-one (product name: IRGACURE 2959), 2-hydroxy-1-{4-[4-(2-hydroxy-2-methyl-propionyl)-benzyl]-phenyl}-2-methyl-propan-1-one (product name: IRGACURE 127), phenylglyoxylic acid methyl ester (product name: DAROCURMBF), 2-methyl-1-[4-(methylthio)phenyl]-2-morpholinopropan-1-one (product name: IRGACURE 907), ethanone,1-[9-ethyl-6-(2-methylbenzoyl)-9H-carbazol-3-yl]-1-(O-acetyloxime) (product name: IRGACUREOXE 02), and 2-ethylhexyl-4-dimethylaminobenzoate (product name: DAROCUREHA).

The compound generating radicals through a self-cleavage reaction by exposure to light and having at least two radical polymerizable groups is more preferably a compound represented by the following formula (1):

[Chem. 4]

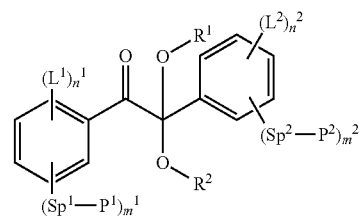

(1)

wherein $R^1$ represents a $C_{1-4}$ linear or branched alkyl or alkenyl group, or $Sp^3$-$P^3$, $R^2$ represents a $C_{1-4}$ linear or branched alkyl or alkenyl group, or $Sp^4$-$P^4$;

$P^1$, $P^2$, $P^3$, and $P^4$ represent the same or different radical polymerizable groups, and the total number of the groups is 2 or more;

$Sp^2$ represents a $C_{1-6}$ linear, branched, or cyclic alkylene, alkyleneoxy, or alkylene carbonyloxy group, or a direct bond, and when $m^1$ is 2 or more, $Sp^1$s are the same as or different from one another;

$Sp^2$ represents a $C_{1-6}$ linear, branched, or cyclic alkylene, alkyleneoxy, or alkylene carbonyloxy group, or a direct bond, and when $m^2$ is 2 or more, $Sp^2$s are the same as or different from one another;

$Sp^3$ represents a $C_{1-6}$ linear, branched, or cyclic alkylene, alkyleneoxy, or alkylene carbonyloxy group;

$Sp^4$ represents a $C_{1-6}$ linear, branched, or cyclic alkylene, alkyleneoxy, or alkylene carbonyloxy group;

$L^1$ represents a —F group, a —OH group, or a $C_{1-12}$ linear or branched alkyl, alkenyl, or aralkyl group, and when $n^4$ is 2 or more, $L^1$s are the same as or different from one another;

if two $L^1$s are bonded to respective two adjacent carbon atoms on the aromatic ring, the two $L^1$s may be bonded to each other to form a ring structure, and are the same as or different from one another, each representing a $C_{1-12}$ linear or branched alkylene or alkenylene group;

$L^2$ represents a —F group, a —OH group, or a $C_{1-12}$ linear or branched alkyl, alkenyl, or aralkyl group, and when $n^2$ is 2 or more, $L^2$s are the same as or different from one another;

if two $L^2$s are bonded to respective two adjacent carbon atoms on the aromatic ring, the two $L^2$s may be bonded to each other to form a ring structure, and are the same as or different from one another, each representing a $C_{1-12}$ linear or branched alkylene or alkenylene group;

one or more hydrogen atoms on the alkyl, alkenyl, alkylene, alkenylene, or aralkyl group for $L^1$ or $L^2$ may be replaced by —F groups or —OH groups;

a —$CH_2$— group on the alkyl, alkenyl, alkylene, alkenylene, or aralkyl group for $L^1$ or $L^2$ may be replaced by a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, a $Sp^1$-$P^1$ group, or a $Sp^2$-$P^2$ group as long as an oxygen atom, a sulfur atom, and a nitrogen atom are mutually apart;

$m^1$ is an integer of 1 to 3;
$m^2$ is an integer of 0 to 3;
$n^1$ is an integer of 0 to 4;
$n^2$ is an integer of 0 to 4;
$m^1$ and $n^1$ add up to an integer of 1 to 5;
$m^2$ and $n^2$ add up to an integer of 0 to 5; and
$m^1$ and $m^2$ add up to an integer of 1 to 6.

The above $P^1$, $P^2$, $P^3$, and $P^4$ are preferably the same or different (meth)acryloyloxy groups, (meth)acryloylamino groups, vinyl groups, or vinyloxy groups.

The above $R^1$ and the above $R^2$ are preferably the same. The above $P^1$ and the above $P^2$ are more preferably the same.

Specific examples of the compound represented by the following formula (1) include compounds represented by the following formula (2):

[Chem. 5]

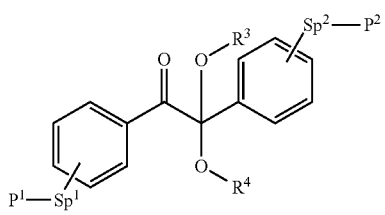

(2)

wherein
$R^3$ represents a $C_{1-4}$ linear or branched alkyl or alkenyl group;

$R^4$ represents a $C_{1-4}$ linear or branched alkyl or alkenyl group;

$P^1$ and $P^2$ represent the same or different radical polymerizable groups;

$Sp^1$ represents a $C_{1-6}$ linear, branched, or cyclic alkylene, alkyleneoxy, or alkylene carbonyloxy group, or a direct bond; and $Sp^2$ represents a $C_{1-6}$ linear, branched, or cyclic alkylene, alkyleneoxy, or alkylene carbonyloxy group, or a direct bond.

The above $P^1$ and $P^2$ are preferably the same or different (meth)acryloyloxy groups, (meth)acryloylamino groups, vinyl groups, or vinyloxy groups.

The above $R^3$ and the above $R^4$ are preferably the same. The above $P^1$ and the above $P^2$ are more preferably the same.

Examples of the compound represented by the above formula (2) include compounds represented by the following formula (3):

[Chem. 6]

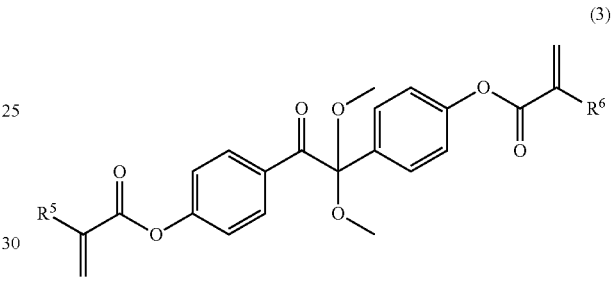

(3)

wherein $R^5$ and $R^6$ are the same as or different from one another, each representing a hydrogen atom or a methyl group.

The compounds represented by the above formulas (1) to (3) each (i) generate radicals when exposed to light having a wavelength of 350 nm or more; (ii) generate radicals when exposed to light having a wavelength of less than 400 nm; and (iii) have an absorption coefficient of 20 ml/g·cm or less for light having a wavelength of 400 nm or more.

The liquid crystal composition preferably further includes one or more kinds of radical polymerizable monomers each having a ring structure and containing a monofunctional or polyfunctional polymerizable group. Each of the radical polymerizable monomers having a ring structure and containing a monofunctional or polyfunctional group is preferably a compound represented by the following formula (4):

[Chem. 7]

$$P^5-Sp^5-R^8-A^1-(Z-A^2)_n-R^7 \qquad (4)$$

wherein
$R^7$ is a —$R^8$—$Sp^5$-$P^5$ group, a hydrogen atom, a halogen atom, —CN group, a —$NO_2$ group, a —NCO group, a —NCS group, a —OCN group, a —SCN group, a —$SF_5$ group, or a $C_{1-18}$ linear or branched alkyl group;

$P^5$ represents a radical polymerizable group;

$Sp^5$ represents a $C_{1-6}$ linear, branched, or cyclic alkylene or alkyleneoxy group, or a direct bond;

a hydrogen atom of $R^7$ may be replaced by a fluorine atom or a chlorine atom;

a —$CH_2$— group in $R^7$ may be replaced by a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_3)$— group, a —$N(C_4H_9)$— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, or a —OCO—CH═CH— group, as long as an oxygen atom and a sulfur atom are mutually apart;

R$^8$ represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_5$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, a —OCO—CH═CH— group, or a direct bond;

A$^1$ and A$^2$ are the same as or different from one another, each representing a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

a —CH$_2$— group in A$^1$ or A$^2$ may be replaced by a —O— group or a —S— group as long as they are mutually apart; one or two or more hydrogen atoms in A$^1$ or A$^2$ may each be replaced by a fluorine atom, a chlorine atom, a —CN group, or a C$_{1-6}$ alkyl, alkoxy, alkyl carbonyl, alkoxycarbonyl, or alkylcarbonyloxy group;

Z represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_5$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, a —OCO—CH═CH— group, or a direct bond; and n is 0, 1, or 2.

Specific examples of the compound represented by the above formula (4) include compounds represented by the following formulas (5-1) to (5-5):

[Chem. 8]

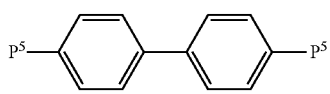

(5-1)

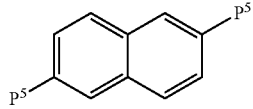

(5-2)

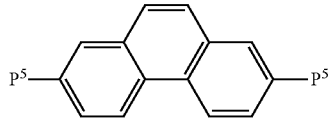

(5-3)

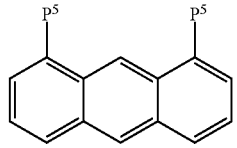

(5-4)

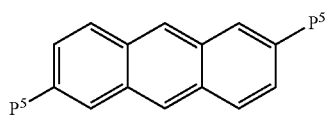

(5-5)

wherein P$^5$s are the same or different radical polymerizable groups.

The above P$^5$s are preferably the same or different (meth) acryloyloxy groups.

Specific preferred examples of the compound represented by the above formula (4) include compounds represented by the following formula (6):

[Chem. 9]

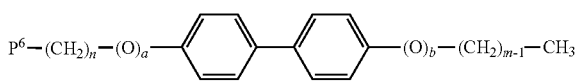

(6)

wherein P$^6$ represents a (meth)acryloyloxy group, a vinyl group, or an allyl group; a is 0 or 1; b is 0 or 1; m is any one of natural numbers 1 to 18; and n is any one of natural numbers 1 to 6.

For example, compounds represented by the following formula (7):

[Chem. 10]

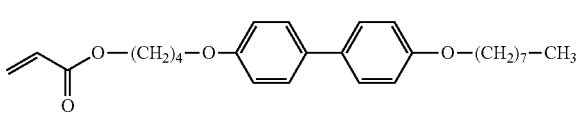

(7)

can be mentioned as specific examples of the compound represented by the above formula (6).

The present invention also relates to a production method which enables suitable production of the liquid crystal display device of the present invention.

That is, another aspect of the present invention is a method for producing a liquid crystal display device, including the steps of: disposing between a pair of substrates a liquid crystal composition containing a liquid crystal material and one or more kinds of radical polymerizable monomers without performing the step of forming an alignment film; and forming on a surface of at least one of the substrates a polymer layer for controlling alignment of liquid crystal molecules by irradiating the liquid crystal composition with light to polymerize the radical polymerizable monomers, at least one kind of the radical polymerizable monomers being a compound generating radicals through a self-cleavage reaction by exposure to light and having at least two radical polymerizable groups.

The method for producing the liquid crystal display device of the present invention includes the step of disposing between a pair of substrates a liquid crystal composition containing a liquid crystal material and one or more kinds of radical polymerizable monomers, but excludes the step of forming an alignment film. At least one kind of the radical polymerizable monomers is a compound generating radicals through a self-cleavage reaction by exposure to light, and having at least two radical polymerizable groups. The liquid crystal material and the radical polymerizable monomers here may be the same ones as those described above for the liquid crystal display device of the present invention.

The method for producing the liquid crystal display device of the present invention includes the step of forming, on a surface of at least one of the substrates, a polymer layer for controlling alignment of liquid crystal molecules by irradiating the liquid crystal composition with light to polymerize the radical polymerizable monomers. When the polymer layer is formed using radical polymerizable monomers having the above features on surfaces of the pair of substrates, the polymerization reaction can proceed in a short time without another polymerization initiator. In addition, impurities from the polymerization initiator are not generated, whereby reduction in the voltage holding ratio (VHR) in the liquid crystal layer is prevented, and deterioration of the display qualities can be reduced. Also, since only a short-time exposure to light is required, deterioration of the constitutional components due to a long-time exposure to light can be prevented, and a liquid crystal display device with high reliability can be produced. Furthermore, the production method of the present invention includes formation of the polymer layer on the surfaces of the substrates. In other words, a liquid crystal composition is disposed between a pair of substrates substantially having no alignment films, and thereafter, the step of forming a polymer layer is performed. With the production method of the present invention, the alignment of liquid crystals can be controlled even without alignment films, and reduction in the voltage holding ratio can also be suppressed. Hence, the capital investment and an increase in the number of production steps for formation of alignment films are not necessary.

The method of the present invention is not especially limited by other steps as long as it essentially includes the above-mentioned steps.

Preferred embodiments of the method for producing a liquid crystal display device according to the present invention include the following embodiments (a) to (o) which are the same as those described for the preferred embodiments of the liquid crystal display device of the present invention. The embodiments are, namely, (a) an embodiment in which the compound generating radicals through a self-cleavage reaction by exposure to light generates radicals when exposed to light having a wavelength of 350 nm or more;

(b) an embodiment in which the compound generating radicals through a self-cleavage reaction by exposure to light generates radicals when exposed to light having a wavelength of less than 400 nm;

(c) an embodiment in which the compound has an absorption coefficient of 20 ml/g·cm or less for light having a wavelength of 400 nm or more;

(d) an embodiment in which the compound generating radicals through a self-cleavage reaction by exposure to light and having at least two radical polymerizable groups is a compound represented by the above formula (1);

(e) an embodiment in which $P^1$, $P^2$, $P^3$, and $P^4$ are the same or different (meth)acryloyloxy groups, (meth)acryloylamino groups, vinyl groups, or vinyloxy groups;

(f) an embodiment in which the compound represented by the above formula (1) is a compound represented by the above formula (2);

(g) an embodiment in which the compound represented by the above formula (2) is a compound represented by the above formula (3);

(h) an embodiment in which the liquid crystal composition further includes one or more kinds of radical polymerizable monomers each having a ring structure and containing a monofunctional or polyfunctional polymerizable group;

(i) an embodiment in which the radical polymerizable monomers each having a ring structure and containing a monofunctional or polyfunctional polymerizable group include a compound represented by the above formula (4);

(j) an embodiment in which the compound represented by the above formula (4) is any one of compounds represented by the above formulas (5-1) to (5-5);

(k) an embodiment in which $P^5$s in the compounds represented by the above formulas (5-1) to (5-5) are the same or different (meth)acryloyloxy groups;

(l) an embodiment in which the compound represented by the above formula (4) is a compound represented by the above formula (6);

(m) an embodiment in which the compound represented by the above formula (6) is a compound represented by the above formula (7);

(n) an embodiment in which the liquid crystal molecules are vertically aligned under application of a voltage not higher than a threshold voltage; and (o) an embodiment in which the liquid crystal material has negative dielectric constant anisotropy.

The step of forming a polymer layer may be performed while a voltage not lower than a threshold voltage is applied to a liquid crystal layer. Irradiation of the liquid crystal layer with light under application of a voltage not lower than a threshold voltage in the PSA polymerization step results in formation of a polymer that reflects the state where the liquid crystal molecules are aligned under application of a voltage not lower than a threshold voltage. Accordingly, the resulting PSA layer defines the initial pretilt angle of the liquid crystal molecules even when the voltage application is eliminated later.

The step of forming a polymer layer may be performed while a voltage not lower than a threshold voltage is not applied to the liquid crystal layer. Even without application of a voltage not lower than a threshold voltage, a polymer layer capable of controlling the alignment of liquid crystals can be formed by employing an appropriate combination of kinds of monomers.

Advantageous Effects of Invention

The present invention can provide a liquid crystal display panel which prevents reduction in the voltage holding ratio (VHR) in the liquid crystal layer and thus has favorable display qualities. The present invention also can provide a liquid crystal display device which has components not likely to be deteriorated by long-time exposure to light, and has high reliability.

DESCRIPTION OF EMBODIMENTS

The present invention will be described in more detail below with reference to the drawings based on embodiments which, however, are not intended to limit the scope of the present invention.

First Embodiment

The liquid crystal display device of the present invention, and a liquid crystal display device produced by the method for producing a liquid crystal display device according to the present invention each can achieve excellent display qualities when the concept of the present invention is applied to a display device such as a television, a personal computer, a cell phone, or an information display.

Figure 1:
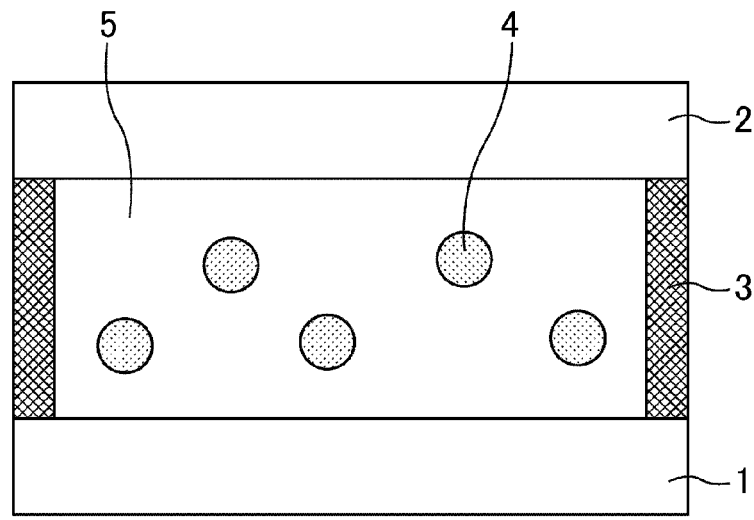
FIG. 1 is a schematic cross-sectional view of a liquid crystal display device of a first embodiment, which illustrates a state before a PSA polymerization step.
Figure 2:
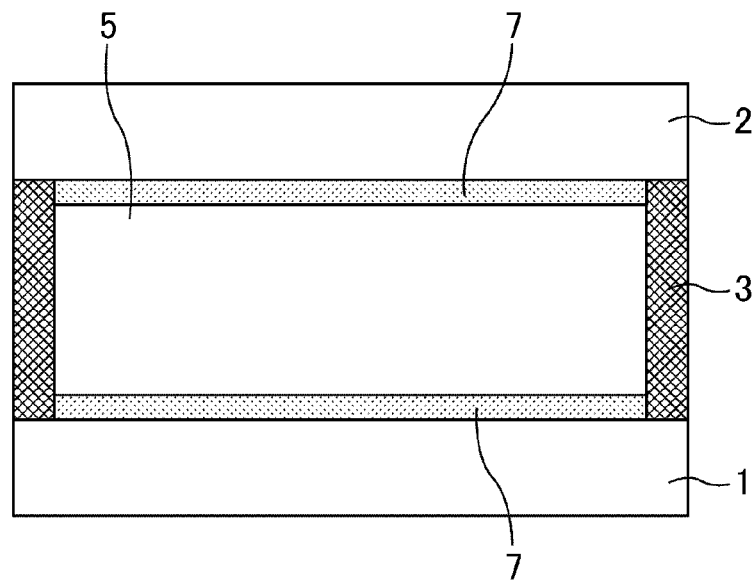
FIG. 2 is a schematic cross-sectional view of the liquid crystal display device of the first embodiment, which illustrates a state after the PSA polymerization step.

FIG. 1 and FIG. 2 are schematic cross-sectional views of the liquid crystal display device of the first embodiment. FIG. 1 illustrates a state before the PSA polymerization step, and FIG. 2 illustrates a state after the PSA polymerization step. As illustrated in FIG. 1 and FIG. 2, the liquid crystal display device of the first embodiment has an array substrate 1, a color filter substrate 2, and a liquid crystal layer 5 disposed between the pair of substrates, namely the array substrate 1 and the color filter 2. The array substrate 1 includes an insulating transparent substrate made of a material such as glass, and components such as various wirings, pixel electrodes, and thin film transistors (TFTs) formed on the transparent substrate. The color filter substrate 2 includes an insulating transparent substrate made of a material such as glass, and components such as color filters, a black matrix, and a common electrode formed on the transparent substrate.

Before the PSA polymerization step, the liquid crystal layer 5 includes a liquid crystal material and one or more kinds of radical polymerizable monomers 4. The liquid crystal material may have positive dielectric constant anisotropy or negative dielectric constant anisotropy. At least one kind of the radical polymerizable monomers 4 is a compound generating radicals through a self-cleavage reaction by exposure to light, and having at least two radical polymerizable groups.

Exposure of the liquid crystal layer 5 to light allows at least one kind of the radical polymerizable monomers 4 to generate radicals through a self-cleavage reaction. With the radicals as active species, the radical polymerizable groups of the radical polymerizable monomers 4 sequentially start to undergo chain polymerization and progress the polymerization. Polymers resulting from the polymerization undergo phase separation to be deposited as polymer layers 7 on the surfaces of the respective substrates 1 and 2 as illustrated in FIG. 2.

At least one kind of the radical polymerizable monomers 4 used in the first embodiment by themselves absorb light and generate radicals to initiate chain polymerization. Therefore, a polymerization initiator needs not to be added. Also, since at least one kind of the radical polymerizable monomers 4 as a polymerization initiator has at least two functional groups, the polymerization initiator itself functions as a monomer, which greatly reduces the amount of the polymerization initiator remaining in the liquid crystal layer 5.

In the PSA polymerization step in the first embodiment, for example, the liquid crystal layer 5 is exposed to light while a voltage not lower than a threshold voltage is applied to the liquid crystal layer 5, and thereby the resulting polymer reflects the state where the liquid crystal molecules are aligned under application of a voltage not lower than a threshold voltage. The resulting PSA layer therefore defines the initial pretilt angle of the liquid crystal molecules even when the voltage application is eliminated later. Still, even when a voltage not lower than a threshold voltage is not applied to the liquid crystal layer 5 in the PSA polymerization step, a PSA layer inducing vertical alignment can be produced using the material for forming PSA layers in the first embodiment.

In the first embodiment, neither of the array substrate 1 and the color filter substrate 2 substantially has an alignment film. That is, the components constituting the respective surfaces of the array substrate 1 and the color filter substrate 2 are, for example, an electrode and an insulating film. Between the array substrate 1 and the color filter substrate 2, a sealing material 3 is disposed. The sealing material 3 is directly attached to the substrates 1 and 2 and located along the outer edge of the substrates 1 and 2. The liquid crystal layer 5 is sealed between the array substrate 1 and the color filter substrate 2 by the sealing material 3. Also, since the liquid crystal layer 5 is exposed to light after the liquid crystal layer 5 is sealed by the sealing material 3, the PSA layers 7 are formed in the region surrounded by the sealing material 3.

The first embodiment may employ a patterned vertical alignment (PVA) mode in which the alignment of liquid crystal molecules is defined by linear slits formed in each pixel electrode of the array substrate 1 or in the common electrode of the color filter substrate 2. In the case of forming thin, linear slits in the pixel electrodes and/or the common electrode, the liquid crystal molecules are oriented to the linear slits when a voltage is applied. Hence, polymerization of the radical polymerizable monomers 4 under application of a voltage not lower than a threshold voltage to the liquid crystal layer 5 enables formation of a PSA layer that aligns the liquid crystal molecules at a pretilt angle.

Figure 3:
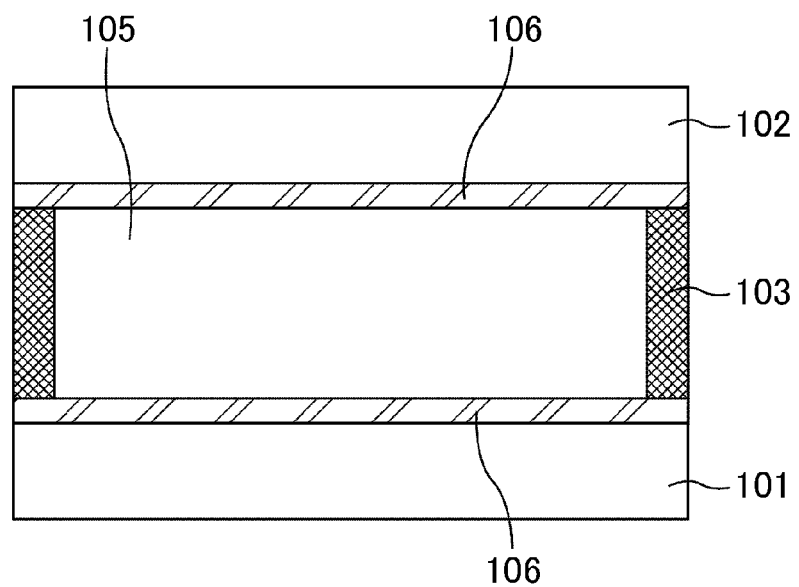
FIG. 3 is a schematic cross-sectional view of a liquid crystal display device with alignment films.

For reference, the structure of a liquid crystal display device with alignment films is described using FIG. 3. In the example illustrated in FIG. 3, each of the array substrate 101 and the color filter substrate 102 is provided with an alignment film 106 formed from a polymer material (polyimide) having a main chain including an imide structure. An alignment treatment such as rubbing or photoalignment to the surfaces of the alignment films 106 allows the liquid crystal molecules to pretilt (initially tilt) vertically or horizontally. Between the array substrate 101 and the color filter substrate 102, a sealing material 103 is disposed. The sealing material 103 is attached to the substrates 101 and 102 and located along the outer edge of the substrates 101 and 102. The liquid crystal layer 105 is sealed between the array substrate 101 and the color filter substrate 102 by the sealing material 103. Since the alignment films 106 need to be formed by application of a material such as a polyimide solution before sealing by the sealing material 103, an alignment film 106 is formed also below the sealing material 103. Examples of the material for forming the alignment films 106, other than the polyimide, include materials each containing at least one of a polyamic acid, a polymaleimide, a polyamide, a polysiloxane, a polyphosphazene, a polysilsesquioxane, and a copolymer thereof.

For the monomers generating radicals through self-cleavage by exposure to light in the first embodiment, compounds represented by the above formula (1), for example, can be used. More specifically, compounds represented by the above formula (2) can be used as the compounds represented by the above formula (1). Still more specifically, compounds represented by the above formula (3) can be used as the compounds represented by the above formula (2).

Since the compounds represented by the above formula (1) generate radicals through self-cleavage, an additional polymerization initiator is not necessary when the monomers are mixed with a liquid crystal material, and irradiation with light alone can initiate the polymerization reaction efficiently. Also, even when easily chargeable impurities which are presumed to be derived from the polymerization initiator are generated, the polymerizable groups of the compound enable the compound to form PSA layers and cause phase separation. Hence, image sticking is less likely to occur than in the case of forming the PSA layers using a polymerization initiator. In the first embodiment, other radical polymerizable monomers can be added to the liquid crystal composition.

In the first embodiment, the composition preferably contains one or more kinds of radical polymerizable monomers each having a ring structure and containing a monofunctional or polyfunctional polymerizable group, as well as the above monomers generating radicals through self-cleavage by exposure to light. For the other monomers, for example, compounds represented by the above formula (4) can be used. More specifically, bifunctional monomers represented by the above formulas (5-1) to (5-5) or monofunctional monomers represented by the above formula (6) can be used as the compounds represented by the above formula (4). Specific examples of the compounds represented by the above formula (6) include compounds represented by the above formula (7).

Other components of the liquid crystal display device of the first embodiment are described in detail.

In the liquid crystal display device of the first embodiment, the array substrate 1, the liquid crystal layer 5, and the color filter substrate 2 are stacked in the stated order from the rear side to the observation side of the liquid crystal display device. A polarizer is mounted at the rear side of the array substrate 1. A polarizer is also mounted at the observation side of the color filter substrate 2. These polarizers each may be further provided with a retardation plate. These polarizers may be circular polarizers.

The liquid crystal display device according to the first embodiment may be any one of a transmissive type, a reflective type, and a transflective type liquid crystal display devices. In the case of the transmissive type or the transflective type, the liquid crystal display device of the first embodiment further includes a backlight. The backlight is disposed at the rear side of the array substrate 1 so that light passes through the array substrate 1, the liquid crystal layer 5, and the color filter substrate 2 in the stated order. In the case of the reflective type or the transflective type, the array substrate 1 is provided with a reflector for reflecting external light. Moreover, at least in the region where reflected light is used for display, the polarizer of the color filter substrate 2 needs to be a circular polarizer having a λ/4 retardation plate.

The liquid crystal display device of the first embodiment may have a color filter on array structure in which the array substrate 1 includes color filters. Moreover, the liquid crystal display device of the first embodiment may be a monochrome display. In this case, color filters are not necessary.

The liquid crystal layer 5 is filled with a liquid crystal material which has an alignment property in a specific direction under a certain voltage. The alignment of the liquid crystal molecules in the liquid crystal layer 5 is controlled by application of a voltage not lower than a threshold voltage. The alignment mode for the liquid crystal molecules in the first embodiment include, but not particularly limited to, the TN mode, the IPS mode, and the VA mode. In the case of using a monofunctional monomer represented by the above formula (7), a mode employing a vertical alignment as the initial alignment, such as the VA mode or the TBA mode, is more preferred because excellent vertical alignment is achieved.

A component analysis of monomers for forming the PSA layers present in the PSA layers, the ratio of the monomers for forming the PSA layers in the PSA layers, the amount of the monomers for forming the PSA layers included in the liquid crystal layer, or the like of the liquid crystal display device according to the first embodiment can be determined by disassembling the liquid crystal display device (e.g., cell phone, monitor, liquid crystal TV (television), information display), and then performing a chemical analysis using a method such as nuclear magnetic resonance (NMR), fourier transform infrared spectroscopy (FT-IR), or mass spectrometry (MS).

EXAMPLE 1

The following will discuss Example 1 in which a liquid crystal cell of the liquid crystal display device of the first embodiment was actually produced. First, a pair of substrates each having an electrode on the surface was prepared. A sealing material was applied to one of the substrates, and beads were scattered on the other of the substrates. The substrates were attached to each other. A liquid crystal composition, containing a liquid crystal material with negative dielectric constant anisotropy and monomers for forming a polymer layer, was injected between the pair of substrates. The sealing material may be cured by heat or ultraviolet light, or by both heat and ultraviolet light.

For the liquid crystal composition, monomers represented by the following formulas (7) and (8) were used in combination. The compound represented by the following formula (7) is a monofunctional acrylate monomer having a biphenyl structure, and the compound represented by the following formula (8) is a bifunctional methacrylate monomer having a benzyl ketal structure.

[Chem. 11]

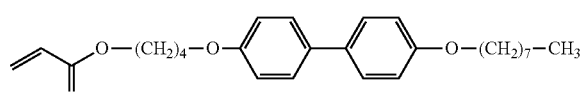

(7)

[Chem. 12]

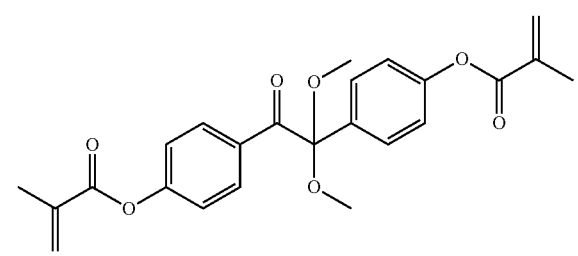

(8)

After the injection of the liquid crystal composition, the composition was annealed at 130° C. for one hour. The composition was irradiated with non-polarized ultraviolet light (0.33 mW/cm$^2$) for 10 minutes (0.2 J/cm$^2$) from the normal direction to the substrates without application of a voltage, so that the monomers were polymerized. The non-polarized ultraviolet light source used was a black light FHF-32BLB produced by Toshiba Lighting and Technology Corporation. The FHF-32BLB is an ultraviolet light source that emits light having a wavelength of 310 nm with low intensity and light having a wavelength of not less than 330 nm with high intensity. The electrodes used were flat electrodes without slits.

When a compound represented by the above formula (8) is irradiated with ultraviolet light, radicals are generated as represented by the following scheme (9). To the radicals are bonded polymerizable groups of the monomers, and thereby the chain of the monomers grows to form a polymer.

[Chem. 13]

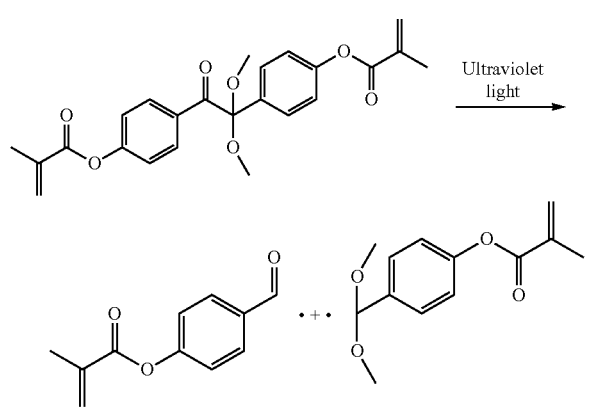

(9)

COMPARATIVE EXAMPLE 1

To verify the effect of the liquid crystal display device of Example 1, a liquid crystal cell was produced in the same manner as in Example 1, but without using monomers generating radicals through self-cleavage by exposure to light.

In Comparative Example 1, a monofunctional acrylate monomer (4-acryloyloxy-4'-octylbiphenyl) represented by the following formula (10):

[Chem. 14]

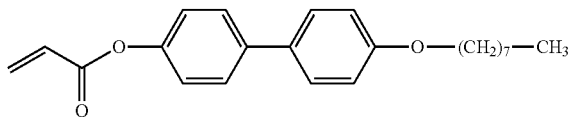

(10)

was mixed into the liquid crystal composition.
Evaluation Test 1

In Example 1, four samples (liquid crystal compositions) were used. For the respective liquid crystal compositions, the introduction amounts of bifunctional methacrylate monomers having a benzyl ketal structure represented by the above formula (8) were 0 wt %, 0.1 wt %, 0.3 wt %, and 0.5 wt %. Here, for each of the compositions, the introduction amount of a monofunctional acrylate monomer having a biphenyl structure represented by the above formula (7) was fixed to 1.0 wt %. The following shows the verification results of the characteristics of the respective liquid crystal compositions.

Each of the produced liquid crystal cells in Example 1 was measured for the voltage holding ratio (VHR). The VHR was determined by checking the charge retention at 70° C. at intervals of 16.61 ms after application of a pulse voltage of 1 V (measuring apparatus: liquid crystal characteristics measurement system, type 6254, product of TOYO Corporation). Table 1 shows the VHR (%) measurement results and the alignment states of the liquid crystal cells formed from the above respective samples in Example 1.

TABLE 1

| | Formula (8) introduction amount (wt %) | | | |
|---|---|---|---|---|
| | 0 | 0.1 | 0.3 | 0.5 |
| Alignment state | Random alignment | Vertical alignment | Vertical alignment | Vertical alignment |
| VHR (%) | 99.2 | 98.8 | 98.7 | 98.7 |

The produced liquid crystal cell in Comparative Example 1 was also measured for the voltage holding ratio (VHR). Table 2 shows the VHR (%) measurement result and the alignment state of the liquid crystal cell in Comparative Example 1.

TABLE 2

| Formula (10) intorudction amount (wt %) | 1.0 |
|---|---|
| Alignment state | Vertical alignment |
| VHR (%) | 75.5 |

As shown in Table 1, vertically aligned cells without alignment defects were obtained by, for polymerization, irradiating with light the monofunctional monomer represented by the above formula (7) of which the introduction concentration was fixed to 1.0 wt % and the polymerization initiating monomer represented by the above formula (8) in an amount less than the monofunctional monomer represented by the above formula (7). Here, the VHR was also as high as 98% or higher.

In contrast, in the case that the polymerization initiating monomer represented by the above formula (8) was not added to the liquid crystal composition, the VHR was as high as 99% or higher. However, polymerization did not occur, and thus vertical alignment was not achieved.

Also in the case of irradiating with ultraviolet light the composition containing only a monofunctional monomer having low light stability, vertical alignment was achieved, but the VHR decreased to a level of 70%.

These results revealed that a favorable alignment state and a high VHR can be achieved when a monofunctional monomer having high light stability and maintaining a high VHR even when exposed to ultraviolet light and a monomer capable of initiating radical polymerization are used in combination.

EXAMPLE 2

The following will discuss Example 2 in which a liquid crystal cell of the liquid crystal display device of the first embodiment was actually produced. First, a pair of substrates each having an electrode on the surface was prepared. A sealing material was applied to one of the substrates, and beads were scattered on the other of the substrates. The substrates were attached to each other. A liquid crystal composition, containing a liquid crystal material with negative dielectric constant anisotropy and monomers for forming a polymer layer, was injected between the pair of substrates. The sealing material may be cured by heat or ultraviolet light, or by both heat and ultraviolet light.

For the liquid crystal composition, monomers represented by the following formulas (7) and (8) were used in combination. The compound represented by the following formula (7) is a monofunctional acrylate monomer having a biphenyl structure, and the compound represented by the following formula (8) is a bifunctional methacrylate monomer having a benzyl ketal structure.

After the injection of the liquid crystal composition, the composition was annealed at 130° C. for one hour. The composition was irradiated with non-polarized ultraviolet light (0.33 mW/cm$^2$) from the normal direction to the substrates without application of a voltage. The electrodes used were flat electrodes without slits.

COMPARATIVE EXAMPLE 2

To verify the effect of the liquid crystal display device of Example 2, a liquid crystal cell was produced in the same manner as in Example 2, but without using monomers generating radicals through self-cleavage by exposure to light.

In Comparative Example 2, the liquid crystal composition was mixed with a monofunctional acrylate monomer (4-acryloyloxy-4'-octylbiphenyl) represented by the above formula (10).

Evaluation Test 2

In Example 2, for the respective samples (liquid crystal compositions), the introduction amounts of bifunctional methacrylate monomers having a benzyl ketal structure represented by the above formula (8) were 0.1 wt %, 0.3 wt %, and 0.5 wt %. Here, for each of the compositions, the introduction amount of a monofunctional acrylate monomer having a biphenyl structure represented by the above formula (7) was fixed to 1.0 wt %. In each of such proportions, four samples were produced with the respective ultraviolet light exposure times of 0 minutes, 1 minute, 5 minutes, and 10 minutes (i.e., a total of 12 samples were produced). Also, in the proportion for Comparative Example 2, four samples were produced with the respective ultraviolet light exposure times of 0 minutes, 1 minute, 5 minutes, and 10 minutes. The following shows the verification results of the characteristics of the respective liquid crystal compositions.

Each of the produced liquid crystal cells in Example 2 was measured for the voltage holding ratio (VHR). The VHR was determined by checking the charge retention at 70° C. at intervals of 16.61 ms after application of a pulse voltage of 1 V (measuring apparatus: liquid crystal characteristics measurement system, type 6254, product of TOYO Corporation). Table 3 shows the VHR (%) measurement results and the alignment states when the introduction amount of the compound represented by the above formula (7) in Example 2 was 0.1 wt %.

TABLE 3

| | Ultraviolet exposure time (min) | | | |
|---|---|---|---|---|
| | 0 | 1 | 5 | 10 |
| Alignment state | Random alignment | Vertical alignment | Vertical alignment | Vertical alignment |
| VHR (%) | 99.8 | 99.0 | 98.9 | 98.8 |

Table 4 shows the VHR (%) measurement results and the alignment states when the introduction amount of the compound represented by the above formula (8) in Example 2 was 0.3 wt %.

TABLE 4

| | Ultraviolet exposure time (min) | | | |
|---|---|---|---|---|
| | 0 | 1 | 5 | 10 |
| Alignment state | Random alignment | Vertical alignment | Vertical alignment | Vertical alignment |
| VHR (%) | 99.8 | 99.0 | 98.8 | 98.7 |

Table 5 shows the VHR (%) measurement results and the alignment states when the introduction amount of the compound represented by the above formula (8) in Example 2 was 0.5 wt %.

TABLE 5

| | Ultraviolet exposure time (min) | | | |
|---|---|---|---|---|
| | 0 | 1 | 5 | 10 |
| Alignment state | Random alignment | Vertical alignment | Veritcal alignment | Vertical alignment |
| VHR (%) | 99.8 | 99.0 | 98.8 | 98.7 |

Each of the produced liquid crystal cells in Comparative Example 2 was also measured for the voltage holding ratio (VHR). Table 6 shows the VHR (%) measurement results and the alignment states of the liquid crystal cell in Comparative Example 2.

TABLE 6

| | Ultraviolet exposure time (min) | | | |
|---|---|---|---|---|
| | 0 | 1 | 5 | 10 |
| Alignment state | Random alignment | Random alignment | Random alignment | Vertical alignment |
| VHR (%) | 99.8 | 95.6 | 89.3 | 75.5 |

The results in Tables 3 to 5 revealed that use of the polymerization initiating monomer represented by the above formula (8) forms vertical alignment while maintaining as high a VHR as 99% or higher by irradiation with ultraviolet light for one minute. The results also show that with a concentration of the polymerization initiating monomer represented by the above formula (8) in the range of 0.1 to 0.5 wt %, a polymer layer is formed while a high VHR is maintained by irradiation with ultraviolet light for one minute, and vertical alignment was achieved.

In contrast, in the case of using a monomer having low light stability represented by the above formula (10) as shown in Table 6, vertical alignment was achieved by irradiation with ultraviolet light for 10 minutes, but the VHR decreased to a level of 70%.

These results revealed that vertical alignment can be achieved with a high VHR maintained after irradiation with ultraviolet light for one minute, when a monofunctional monomer having high light stability and capable of maintaining a high VHR even when exposed to ultraviolet light (e.g., a compound represented by the above formula (7)) and a monomer capable of initiating radical polymerization (e.g., a compound represented by the above formula (8)) are used in combination.

EXAMPLE 3

The following will discuss Example 3 in which a liquid crystal cell of the liquid crystal display device of the first embodiment was actually produced. First, a pair of substrates each having an electrode on the surface was prepared. A sealing material was applied to one of the substrates, and beads were scattered on the other of the substrates. The substrates were attached to each other. A liquid crystal composition, containing a liquid crystal material with negative dielectric constant anisotropy and monomers for forming a polymer layer, was injected between the pair of substrates. The sealing material may be cured by heat or ultraviolet light, or by both heat and ultraviolet light.

For the liquid crystal composition, monomers represented by the above formulas (7) and (8) were used in combination. The compound represented by the above formula (7) is a monofunctional acrylate monomer having a biphenyl structure, and the compound represented by the above formula (8) is a bifunctional methacrylate monomer having a benzyl ketal structure.

After the injection of the liquid crystal composition, the composition was annealed at 130° C. for one hour. The composition was irradiated with non-polarized ultraviolet light (0.33 mW/cm$^2$) for 10 minutes (0.2 J/cm$^2$) from the normal direction to the substrates, without application of a voltage. The electrodes used were flat electrodes without slits.

COMPARATIVE EXAMPLE 3

To verify the effect of the monomer represented by the above formula (8), a liquid crystal cell was produced in the same manner as in Example 3, but using a monomer generating radicals through self-cleavage by exposure to light but being non-polymerizable, which is represented by following formula (11):

[Chem. 15]

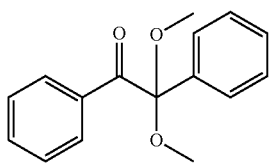

(11)

in the liquid crystal composition.

The reaction path of the monomer represented by the above formula (11) in Example 3 is represented by the following scheme (12).

[Chem. 16]

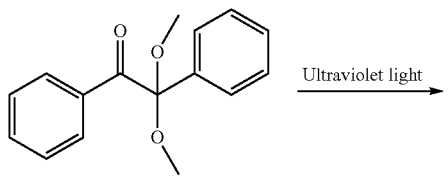

(12)

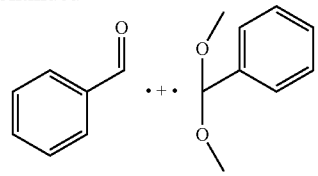

In Comparative Example 3, however, irradiation with ultraviolet light causes self-cleavage as shown in the above scheme (12), but the monomer does not function as a monomer capable of a polymerization reaction because it does not have a polymerizable group.

Therefore, in this case, unreacted initiator remains in the liquid crystal layer after completion of the PSA treatment step, and thus the voltage holding ratio may decrease because of a long-term aging resulting from, for example, use of a common backlight.

Evaluation Test 3

The introduction amount of bifunctional methacrylate monomers having a benzyl ketal structure represented by the above formula (8) was 0.1 wt %, and the introduction amount of monofunctional acrylate monomers having a biphenyl structure represented by the above formula (7) was 1.0 wt %, in the sample (liquid crystal composition) of Example 3. Also, a sample (liquid crystal composition) was used for which the introduction amount of polymerization initiator having a benzyl ketal structure represented by the above formula (11) was 0.1 wt % and the introduction amount of monofunctional acrylate monomers having a biphenyl structure represented by the above formula (7) was 1.0 wt %. The following shows the verification results of the characteristics of the respective liquid crystal compositions.

The voltage holding ratio (VHR) of each of the produced liquid crystal cells in Example 3 and Comparative Example 3 was measured before backlight aging and after 100-hour backlight aging. The VHR was determined by checking the charge retention at 70° C. at intervals of 16.61 ms after application of a pulse voltage of 1 V (measuring apparatus: liquid crystal characteristics measurement system, type 6254, product of TOYO Corporation).

Table 7 shows the VHR (%) measurement results of the liquid crystal cells in Example 3 and Comparative Example 3 before backlight aging and after 100-hour backlight aging.

TABLE 7

| Backlight aging (min) | 0 | 100 |
|---|---|---|
| Formula (8) + formula (7) | 98.8 | 97.7 |
| Formula (11) + formula (7) | 98.8 | 94.0 |

As shown in Table 7, the VHR was at a level of 97% even after the 100-hour backlight aging when the polymerization initiating monomer (monomer having a polymerizable group) represented by the above formula (8) was used, whereas the VHR was below 95% after the 100-hour backlight aging when the polymerization initiator (without a polymerizable group) represented by the above formula (11) was used.

These results revealed that use of an initiator having a polymerizable group (polymerization initiating monomer) represented by the above formula (8) significantly suppressed reduction in the VHR due to backlight aging.

The present application claims priority to Patent Application No. 2011-051533 filed in Japan on Mar. 9, 2011 under the Paris Convention and provisions of national law in a designated State, the entire contents of which are hereby incorporated by reference.

Reference Signs List 1, 101: Array substrate
2, 102: Color filter substrate
3, 103: Sealing material
4: Radical polymerizable monomer
5, 105: Liquid crystal layer
7: PSA layer (polymer layer)
106: Alignment film

The invention claimed is:
1. A liquid crystal display device comprising:
a pair of substrates each having no alignment film;
a liquid crystal layer which is disposed between the pair of substrates and contains a liquid crystal material; and
a polymer layer which is formed on a surface of at least one of the substrates and controls alignment of liquid crystal molecules,
the polymer layer being formed by polymerization of one or more kinds of radical polymerizable monomers added to the liquid crystal layer,
at least one kind of the radical polymerizable monomers being a compound generating radicals through a self-cleavage reaction by exposure to light and having at least two radical polymerizable groups,
wherein the compound generating radicals through a self-cleavage reaction by exposure to light generates radicals when exposed to light having a wavelength of 350 nm or more.
2. The liquid crystal display device according to claim 1, wherein the compound generating radicals through a self-cleavage reaction by exposure to light generates radicals when exposed to light having a wavelength of less than 400 nm.
3. The liquid crystal display device according to claim 1, wherein the compound has an absorption coefficient of 20 ml/g.cm or less for light having a wavelength of 400 nm or more.
4. The liquid crystal display device according to claim 1, wherein the compound generating radicals through a self-cleavage reaction by exposure to light and having at least two radical polymerizable groups is a compound represented by the following formula (1):

[Chem. 1]

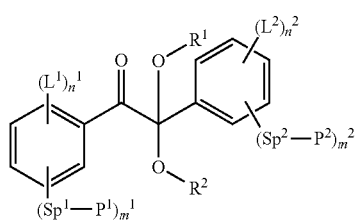

(1)

wherein
$R^1$ represents a $C_{1-4}$ linear or branched alkyl or alkenyl group, or $Sp^3$-$P^3$;
$R^2$ represents a $C_{1-4}$ linear or branched alkyl or alkenyl group, or $Sp^4$-$P^4$;
$P^1$, $P^2$, $P^3$, and $P^4$ represent the same or different radical polymerizable groups, and the total number of the groups is 2 or more;
$Sp^1$ represents a $C_{1-6}$ linear, branched, or cyclic alkylene, alkyleneoxy, or alkylene carbonyloxy group, or a direct bond, and when $m^1$ is 2 or more, $Sp^1$s are the same as or different from one another;
$Sp^2$ represents a $C_{1-6}$ linear, branched, or cyclic alkylene, alkyleneoxy, or alkylene carbonyloxy group, or a direct bond, and when $m^2$ is 2 or more, $Sp^2$s are the same as or different from one another;
$Sp^3$ represents a $C_{1-6}$ linear, branched, or cyclic alkylene, alkyleneoxy, or alkylene carbonyloxy group;
$Sp^4$ represents a $C_{1-6}$ linear, branched, or cyclic alkylene, alkyleneoxy, or alkylene carbonyloxy group;
$L^1$ represents a —F group, a —OH group, or a $C_{1-12}$ linear or branched alkyl, alkenyl, or aralkyl group, and when $n^1$ is 2 or more, $L^1$s are the same as or different from one another;
if two $L^1$s are bonded to respective two adjacent carbon atoms on the aromatic ring, the two $L^1$s may be bonded to each other to form a ring structure, and are the same as or different from one another, each representing a $C_{1-12}$ linear or branched alkylene or alkenylene group;
$L^2$ represents a —F group, a —OH group, or a $C_{1-12}$ linear or branched alkyl, alkenyl, or aralkyl group, and when $n^2$ is 2 or more, $L^2$s are the same as or different from one another;
if two $L^2$s are bonded to respective two adjacent carbon atoms on the aromatic ring, the two $L^2$s may be bonded to each other to form a ring structure, and are the same as or different from one another, each representing a $C_{1-12}$ linear or branched alkylene or alkenylene group;
one or more hydrogen atoms on the alkyl, alkenyl, alkylene, alkenylene, or aralkyl group for $L^1$ or $L^2$ may be replaced by —F groups or —OH groups;
a —CH$_2$— group on the alkyl, alkenyl, alkylene, alkenylene, or aralkyl group for $L^1$ or $L^2$ may be replaced by a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CHCH=COO— group, a —OCO—CH=CH— group, a $Sp^1$-$P^1$ group, or a $Sp^2$-$P^2$ group as long as an oxygen atom, a sulfur atom, and a nitrogen atom are mutually apart;
$m^1$ is an integer of 1 to 3;
$m^2$ is an integer of 0 to 3;
$n^1$ is an integer of 0 to 4;
$n^2$ is an integer of 0 to 4;
$m^1$ and $n^1$ add up to an integer of 1 to 5;
$m^2$ and $n^2$ add up to an integer of 0 to 5; and
$m^1$ and $m^2$ add up to an integer of 1 to 6.
5. The liquid crystal display device according to claim 4, wherein the compound generating radicals through a self-cleavage reaction by exposure to light and having at least two radical polymerizable groups is a compound represented by the following formula (2):

[Chem. 2]

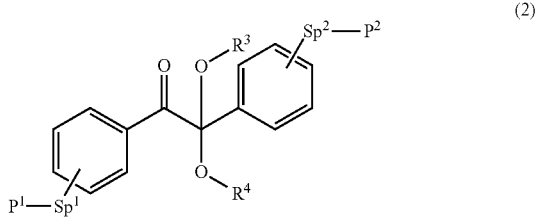

(2)

wherein
  $R^3$ represents a $C_{1-4}$ linear or branched alkyl or alkenyl group;
  $R^4$ represents a $C_{1-4}$ linear or branched alkyl or alkenyl group;
  $P^1$ and $P^2$ represent the same or different radical polymerizable groups;
  $Sp^1$ represents a $C_{1-6}$ linear, branched, or cyclic alkylene, alkyleneoxy, or alkylene carbonyloxy group, or a direct bond; and
  $Sp^2$ represents a $C_{1-6}$ linear, branched, or cyclic alkylene, alkyleneoxy, or alkylene carbonyloxy group, or a direct bond.

6. The liquid crystal display device according to claim 1, wherein the polymer layer is formed by further polymerizing one or more kinds of radical polymerizable monomers each having a ring structure and containing a monofunctional or polyfunctional polymerizable group.

7. The liquid crystal display device according to claim 6, wherein the radical polymerizable monomers each having a ring structure and containing a monofunctional or polyfunctional polymerizable group include a compound represented by the following formula (4):

[Chem. 3]

$$P^5\text{-}Sp^5\text{-}R^8\text{-}A^1\text{-}(Z\text{-}A^2)_n\text{-}R^7 \quad (4)$$

wherein
  $R^7$ is a —$R^8$-$Sp^5$-$P^5$ group, a hydrogen atom, a halogen atom, —CN group, a —NO$_2$ group, a —NCO group, a —NCS group, a —OCN group, a —SCN group, a —SF$_5$ group, or a $C_{1-18}$ linear or branched alkyl group;
  $P^5$ represents a radical polymerizable group;
  $Sp^5$ represents a $C_{1-6}$ linear, branched, or cyclic alkylene or alkyleneoxy group, or a direct bond;
  a hydrogen atom of $R^7$ may be replaced by a fluorine atom or a chlorine atom;
  a —CH$_2$—group in $R^7$ may be replaced by a —O— group, a —S— group, a —NH— group, a —CO— group, a —COO— group, a —OCO— group, a —O—COO— group, a —OCH$_2$— group, a —CH$_2$O—group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a—CF=CF— group, a —C≡C— group, a —CH—COO— group, or a —OCO13 CH=CH— group, as long as an oxygen atom and a sulfur atom are mutually apart;
  $R^8$ represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$) — group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond;
  $A^1$ and $A^2$ are the same as or different from one another, each representing a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;
  a —CH$_2$— group in $A^1$ or $A^2$ may be replaced by a —O— group or a —S— group as long as they are mutually apart;
  one or two or more hydrogen atoms in $A^1$ or $A^2$ may each be replaced by a fluorine atom, a chlorine atom, a —CN group, or a $C_{1-6}$ alkyl, alkoxy, alkyl carbonyl, alkoxycarbonyl, or alkylcarbonyloxy group;
  Z represents a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$) — group, a —CF$_2$O— group, a —OCF$_2$— group, a —CF$_2$S— group, a —SCF$_2$— group, a —N(CF$_3$) — group, a —CH$_2$CH$_2$— group, a —CF$_2$CH$_2$— group, a —CH$_2$CF$_2$— group, a —CF$_2$CF$_2$— group, a —CH=CH— group, a—CF=CF— group, a —C≡C— group, a —CH=CH—COO— group, a —OCO—CH=CH— group, or a direct bond; and
  n is 0, 1, or 2.

8. The liquid crystal display device according to claim 7, wherein $P^5$ is a (meth)acryloyloxy group.

9. The liquid crystal display device according to claim 7, wherein the radical polymerizable monomers each having a ring structure and containing a monofunctional polymerizable group is defined by a compound represented by the following formula (6):

[Chem. 4]

(6)

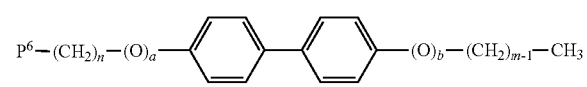

wherein $P^6$ represents a (meth)acryloyloxy group, a vinyl group, or an allyl group; a is 0 or 1; b is 0 or 1; m1 is any one of natural numbers 1 to 18; and n is any one of natural numbers 1 to 6.

10. The liquid crystal display device according to claim 1, wherein the liquid crystal molecules are vertically aligned under application of a voltage not higher than a threshold voltage.

11. The liquid crystal display device according to claim 1, wherein the liquid crystal material has negative dielectric constant anisotropy.

12. The liquid crystal display device according to claim 7, wherein the radical polymerizable monomers each have a ring structure and contain a polyfunctional polymerizable group.

13. A liquid crystal display device comprising:
a pair of substrates each having no alignment film;
a liquid crystal layer which is disposed between the pair of substrates and contains a liquid crystal material; and
a polymer layer which is formed on a surface of at least one of the substrates and controls alignment of liquid crystal molecules,
the polymer layer being formed by polymerization of one or more kinds of radical polymerizable monomers added to the liquid crystal layer,
at least one kind of the radical polymerizable monomers being a compound generating radicals through a self-cleavage reaction by exposure to light and having at least two radical polymerizable groups,
wherein the compound generating radicals through a self-cleavage reaction by exposure to light generates radicals when exposed to light having a wavelength of less than 400 nm.

14. A liquid crystal display device comprising:
a pair of substrates each having no alignment film;
a liquid crystal layer which is disposed between the pair of substrates and contains a liquid crystal material; and
a polymer layer which is formed on a surface of at least one of the substrates and controls alignment of liquid crystal molecules,
the polymer layer being formed by polymerization of one or more kinds of radical polymerizable monomers added to the liquid crystal layer,
at least one kind of the radical polymerizable monomers being a compound generating radicals through a self-cleavage reaction by exposure to light and having at least two radical polymerizable groups,
wherein the polymer layer is formed by further polymerizing one or more kinds of radical polymerizable monomers each having a ring structure and containing a monofunctional or polyfunctional polymerizable group.

15. The liquid crystal display device according to claim 14, wherein the radical polymerizable monomers each having a ring structure and containing a monofunctional or polyfunctional polymerizable group include a compound represented by the following formula (4):
[Chem. 3]

$$P^5\text{-}Sp^5\text{-}R^8\text{-}A^1(Z\text{-}A^2)_n\text{-}R^7 \quad (4)$$

wherein
$R^7$ is a —$R^8$-$Sp^5$-$P^5$ group, a hydrogen atom, a halogen atom, —CN group, a —$NO_2$group, a —NCO group, a —NCS group, a —OCN group, a —SCN group, a —$SF_5$ group, or a $C_{1-18}$ linear or branched alkyl group;
$P^5$ represents a radical polymerizable group;
$Sp^5$ represents a $C_{1-6}$ linear, branched, or cyclic alkylene or alkyleneoxy group, or a direct bond;
a hydrogen atom of $R^7$ may be replaced by a fluorine atom or a chlorine atom;
a —$CH_2$—group in $R^7$ may be replaced by a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group, as long as an oxygen atom and a sulfur atom are mutually apart;
$R^8$ represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond;
$A^1$ and $A^2$ are the same as or different from one another, each representing a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;
a —$CH_2$— group in $A^1$ or $A^2$ may be replaced by a —O— group or a —S— group as long as they are mutually apart;
one or two or more hydrogen atoms in $A^1$ or $A^2$ may each be replaced by a fluorine atom, a chlorine atom, a —CN group, or a $C_{1-6}$ alkyl, alkoxy, alkyl carbonyl, alkoxycarbonyl, or alkylcarbonyloxy group;
Z represents a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond; and
n is 0, 1, or 2.

16. The liquid crystal display device according to claim 15, wherein $P^5$ is a (meth)acryloyloxy group.

17. The liquid crystal display device according to claim 15, wherein the radical polymerizable monomers each having a ring structure and containing a monofunctional polymerizable group is defined by a compound represented by the following formula (6):

[Chem. 4]

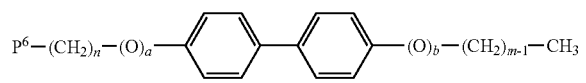

(6)

wherein $P^6$ represents a (meth)acryloyloxy group, a vinyl group, or an allyl group; a is 0 or 1; b is 0 or 1; m1 is any one of natural numbers 1 to 18; and n is any one of natural numbers 1 to 6.

18. The liquid crystal display device according to claim 2, wherein the compound generating radicals through a self-cleavage reaction by exposure to light and having at least two radical polymerizable groups is a compound represented by the following formula (1):

[Chem. 1]

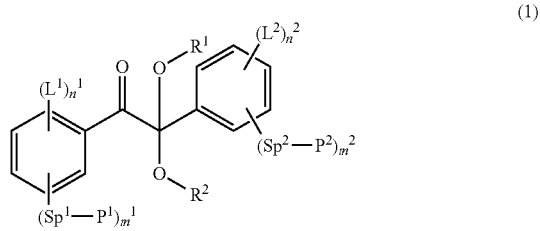

(1)

wherein
$R^1$ represents a $C_{1-4}$ linear or branched alkyl or alkenyl group, or $Sp^3$-$P^3$;
$R^2$ represents a $C_{1-4}$ linear or branched alkyl or alkenyl group, or $Sp^4$-$P^4$;
$P^1$, $P^2$, $P^3$, and $P^4$ represent the same or different radical polymerizable groups, and the total number of the groups is 2 or more;
$Sp^1$ represents a $C_{1-6}$ linear, branched, or cyclic alkylene, alkyleneoxy, or alkylene carbonyloxy group, or a direct bond, and when $m^1$ is 2 or more, $Sp^1$s are the same as or different from one another;
$Sp^2$ represents a $C_{1-6}$ linear, branched, or cyclic alkylene, alkyleneoxy, or alkylene carbonyloxy group, or a direct bond, and when $m^2$ is 2 or more, $Sp^2$s are the same as or different from one another;
$Sp^3$ represents a $C_{1-6}$ linear, branched, or cyclic alkylene, alkyleneoxy, or alkylene carbonyloxy group;
$Sp^4$ represents a $C_{1-6}$ linear, branched, or cyclic alkylene, alkyleneoxy, or alkylene carbonyloxy group;
$L^1$ represents a —F group, a —OH group, or a $C_{1-12}$ linear or branched alkyl, alkenyl, or aralkyl group, and when $n^1$ is 2 or more, $L^1$s are the same as or different from one another;
if two $L^1$s are bonded to respective two adjacent carbon atoms on the aromatic ring, the two $L^1$s may be bonded to each other to form a ring structure, and are the same as or different from one another, each representing a $C_{1-12}$ linear or branched alkylene or alkenylene group;
$L^2$ represents a —F group, a —OH group, or a $C_{1-12}$ linear or branched alkyl, alkenyl, or aralkyl group, and when $n^2$ is 2 or more, $L^2$s are the same as or different from one another;
if two $L^2$s are bonded to respective two adjacent carbon atoms on the aromatic ring, the two $L^2$s may be bonded to each other to form a ring structure, and are the same as or different from one another, each representing a $C_{1-12}$ linear or branched alkylene or alkenylene group;
one or more hydrogen atoms on the alkyl, alkenyl, alkylene, alkenylene, or aralkyl group for $L^1$ or $L^2$ may be replaced by —F groups or —OH groups;
a —$CH_2$— group on the alkyl, alkenyl, alkylene, alkenylene, or aralkyl group for $L^1$ or $L^2$ may be replaced by a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, a —OCO—CH═CH— group, a $Sp^1$-$P^1$ group, or a $Sp^2$-$P^2$ group as long as an oxygen atom, a sulfur atom, and a nitrogen atom are mutually apart;
$m^1$ is an integer of 1 to 3;
$m^2$ is an integer of 0 to 3;
$n^1$ is an integer of 0 to 4;
$n^2$ is an integer of 0 to 4;
$m^1$ and $n^1$ add up to an integer of 1 to 5;
$m^2$ and $n^2$ add up to an integer of 0 to 5; and
$m^1$ and $m^2$ add up to an integer of 1 to 6.

19. The liquid crystal display device according to claim 3, wherein the compound generating radicals through a self-cleavage reaction by exposure to light and having at least two radical polymerizable groups is a compound represented by the following formula (1):

[Chem. 1]

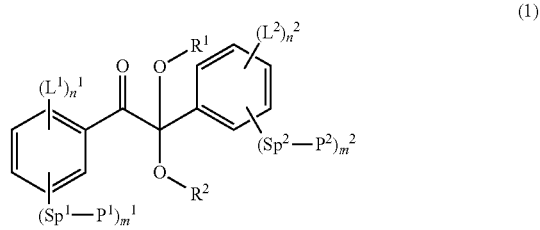

(1)

wherein
$R^1$ represents a $C_{1-4}$ linear or branched alkyl or alkenyl group, or $Sp^3$-$P^3$;
$R^2$ represents a $C_{1-4}$ linear or branched alkyl or alkenyl group, or $Sp^4$-$P^4$;
$P^1$, $P^2$, $P^3$, and $P^4$ represent the same or different radical polymerizable groups, and the total number of the groups is 2 or more;
$Sp^1$ represents a $C_{1-6}$ linear, branched, or cyclic alkylene, alkyleneoxy, or alkylene carbonyloxy group, or a direct bond, and when $m^1$ is 2 or more, $Sp^1$s are the same as or different from one another;

Sp² represents a C_≠ linear, branched, or cyclic alkylene, alkyleneoxy, or alkylene carbonyloxy group, or a direct bond, and when m² is 2 or more, Sp²s are the same as or different from one another;

Sp³ represents a $C_{1-6}$ linear, branched, or cyclic alkylene, alkyleneoxy, or alkylene carbonyloxy group;

Sp⁴ represents a $C_{1-6}$ linear, branched, or cyclic alkylene, alkyleneoxy, or alkylene carbonyloxy group;

$L^1$ represents a —F group, a —OH group, or a $C_{1-12}$ linear or branched alkyl, alkenyl, or aralkyl group, and when $n^1$ is 2 or more, $L^1$s are the same as or different from one another;

if two $L^1$s are bonded to respective two adjacent carbon atoms on the aromatic ring, the two $L^1$s may be bonded to each other to form a ring structure, and are the same as or different from one another, each representing a $C_{1-12}$ linear or branched alkylene or alkenylene group;

$L^2$ represents a —F group, a —OH group, or a $C_{1-12}$ linear or branched alkyl, alkenyl, or aralkyl group, and when $n^2$ is 2 or more, $L^2$s are the same as or different from one another;

if two $L^2$s are bonded to respective two adjacent carbon atoms on the aromatic ring, the two $L^2$s may be bonded to each other to form a ring structure, and are the same as or different from one another, each representing a $C_{1-12}$ linear or branched alkylene or alkenylene group;

one or more hydrogen atoms on the alkyl, alkenyl, alkylene, alkenylene, or aralkyl group for $L^1$ or $L^2$ may be replaced by —F groups or —OH groups;

a —CH₂— group on the alkyl, alkenyl, alkylene, alkenylene, or aralkyl group for $L^1$ or $L^2$ may be replaced by a —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, a —OCO—CH=CH— group, a Sp¹-P¹ group, or a Sp²-P² group as long as an oxygen atom, a sulfur atom, and a nitrogen atom are mutually apart;

$m^1$ is an integer of 1 to 3;
$m^2$ is an integer of 0 to 3;
$n^1$ is an integer of 0 to 4;
$n^2$ is an integer of 0 to 4;
$m^1$ and $n^1$ add up to an integer of 1 to 5;
$m^2$ and $n^2$ add up to an integer of 0 to 5; and
$m^1$ and $m^2$ add up to an integer of 1 to 6.

20. The liquid crystal display device according to claim 13, wherein:
the liquid crystal molecules are vertically aligned under application of a voltage not higher than a threshold voltage; and
the liquid crystal material has negative dielectric constant anisotropy.

* * * * *